United States Patent [19]

Le Brasseur

[11] Patent Number: 4,465,781
[45] Date of Patent: Aug. 14, 1984

[54] HALOGENATED CATALYST FOR ETHYLENE POLYMERIZATION CONTAINING A TRANSITION METAL AND MAGNESIUM AND PROCESS FOR ITS PREPARATION

[75] Inventor: Geneviève Le Brasseur, Bully les Mines, France

[73] Assignee: Societe Chimique des Charbonnages-CdF Chimie, Paris, France

[21] Appl. No.: 399,242

[22] Filed: Jul. 19, 1982

[30] Foreign Application Priority Data

Jul. 20, 1981 [FR] France .................. 81 14053

[51] Int. Cl.$^3$ ............... C08F 4/62; C08F 4/64; C08F 4/68
[52] U.S. Cl. .................. 502/104; 502/107; 502/117; 502/125; 502/133; 502/134; 526/124; 526/125
[58] Field of Search ............ 252/429 B, 429 C; 502/104, 107, 117, 125, 133, 134

[56] References Cited

U.S. PATENT DOCUMENTS

| | | | |
|---|---|---|---|
| 3,412,174 | 11/1968 | Kroll | 252/429 B X |
| 3,969,332 | 7/1976 | Gloridd et al. | 252/429 A X |
| 4,115,319 | 9/1978 | Scata et al. | 252/429 B |
| 4,224,184 | 9/1980 | Staiger | 252/429 B |

FOREIGN PATENT DOCUMENTS

| | | |
|---|---|---|
| 0007565 | 2/1980 | European Pat. Off. |
| 2241569 | 3/1975 | France . |
| 2324652 | 4/1977 | France . |

Primary Examiner—Patrick Garvin
Attorney, Agent, or Firm—Finnegan, Henderson, Farabow, Garrett & Dunner

[57] ABSTRACT

A halogen-containing catalyst for the polymerization of ethylene or copolymerization of ethylene and α-olefins having from 3 to 8 carbon atoms and a process for their preparation. The catalyst has the general formula: $M_n Mg(OR)_{2-m} X_{m+4n}$, wherein M is a metal of groups IVa to VIa of the Periodic Tables, X is a halogen, R is an alkyl radical containing from 1 to 4 carbon atoms, $0 < m < 2$, and $0.05 < n < 1$.

7 Claims, No Drawings

HALOGENATED CATALYST FOR ETHYLENE POLYMERIZATION CONTAINING A TRANSITION METAL AND MAGNESIUM AND PROCESS FOR ITS PREPARATION

BACKGROUND OF THE INVENTION

The present invention relates to catalysts for the polymerization of ethylene and to a process for their preparation.

French Pat. No. 2,324,652 describes solid catalysts for polymerizing ethylene and/or α-olefins, wherein the catalysts include compounds containing titanium, magnesium, and halogens and in which the atomic ration of the halogen, X, to magnesium, Mg, is not less than 1 (X/Mg≧1) and the atomic ratio of the titanium, Ti, to magnesium is greater than 1 (Ti/Mg>1). A catalyst of this type can be obtained by bringing a titanium compound into contact with the solid halogenation product obtained from reacting a halogenating agent with a magnesium compound, such as a magensium alcoholate. During the halogenation reaction, the atomic ratio of halogen to magnesium is greater than 2; X/Mg>2.

European Pat. No. 7,565 describes the preparation of a titanium compound for the manufacture of catalysts for the polymerization of α-olefins, which comprises reacting a magnesium alcoholate with benzoyl chloride in a mill, the ethyl benzoate formed being retained in the product obtained, and then in treating the product twice with an excess of titanium tetrachloride.

SUMMARY OF THE INVENTION

In contrast with this prior art, it has been found that if the atomic ratio of the halogen to magnesium is less than 1 (X/Mg<1) during the halogenation reaction, if the atomic ratio of the transition metal M, for example titanium, to magnesium in the catalyst is less than 1 (M/Mg<1); and if the ester formed by the reaction of the magnesium alcoholate with the halogenating agent is removed, then the catalysts obtained have greatly improved activity.

More particularly, the invention comprises a catalyst for the homopolymerization of ethylene or the copolymerization of ethylene with α-olefins in which the catalyst comprises at least one transition metal, M, selected from the metals of groups IVa to VIa of the Periodic Table; magnesium, Mg; and at least one halogen, X and in which the catalyst has the general formula $M_nMg(OR)_{2-m}X_{m+4n}$ wherein R is an alkyl radical having from 1 to 4 carbon atoms, $0<m<2$, and $0.5<n<1$.

DESCRIPTION OF THE PREFERRED EMBODIMENTS

Reference will now be made in detail to the presently preferred embodiments of the invention.

The transition metal, M, of the catalyst of this invention is selected from the group consisting of titanium, vanadium, zirconium, chromium, or a mixture of these metals. If M is a mixture of these metals, then the index n in the catalyst formula set forth above applies to the sum of the various metal atoms.

The halogen X is selected from the group consisting of fluorine, chlorine, bromine, iodine, or a mixture of these elements. Here too, if X is a mixture of halogens, then the index $m+4n$ applies to the sum of the various halogen atoms.

The transition metal M is preferably either titanium or vanadium and the halogen is preferably chlorine.

In contrast to catalysts of the prior art, the catalysts according to the invention are such that the atomic ratio of the transition metal M to the magnesium, M/Mg, is less than 1 (M/Mg<1).

The present invention also provides a process for the preparation of these catalysts of the invention.

The process comprises four steps:

(a) reacting an organic acid halide, R'COX, in which R' is an alkyl group containing from 1 to 12 carbon atoms and X is one of the halogens set forth above, with a magnesium alcoholate, $Mg(OR)_2$, in which the radical R is an alkyl group containing from 1 to 4 carbon atoms, in an atomic ratio X/Mg<1;

(b) washing the product obtained from step (a) with a solvent and optionally drying it;

(c) reacting the product obtained from step (b), at a temperature between $-10°$ and $150°$ C., with an excess of a transition metal halide selected from the metals of groups IVa to VIa of the Periodic Table, and wherein the metal is at its maximum valency; and (d) washing the product obtained from (c) with a solvent, and drying the product.

The halogen X used in the organic acid halide, R'COX, is selected from the group consisting of fluorine, chlorine, bromine, and iodine. Chlorine is preferred. Acetyl chloride, $CH_3COCl$ is the preferred organic acid halide. The magnesium alcoholate is preferably chosen from the group consisting of magnesium methylate, magnesium ethylate, magnesium n-propylate and magnesium isopropylate.

The solvent used in steps (b) and (d) for washing the products obtained in steps (a) and (c) respectively is a solvent that is inert towards the products obtained. Saturated aliphatic and cycloaliphatic hydrocarbons, such as hexane, heptane, octane, or their branched or unbranched cyclic isomers are suitable as solvents. Methylcyclohexane is preferred.

The transition metal M in the transition metal halide is selected from the group consisting of titanium, vanadium, zirconium, and chrominum. Titanium tetrachloride, $TiCl_4$; vanadium tetrachloride, $VCl_4$; vanadium oxychloride, $VOCl_3$; or mixtures thereof, are advantageously used. The halogen of the transition metal halide can be identical to or different from the halogen of the organic acid halide.

The reaction of the organic acid halide with the magnesium alcoholate is carried out at a low temperature in view of the exothermic nature of this reaction. The reaction temperature is advantageously between $-20°$ and $0°$ C. The magnesium alcoholates are preferably suspended, prior to the reaction, in an inert solvent, for example the solvent that is used in the subsequent washing, step (b). The alkyl ester formed in the course of the reaction may be removed during the washing or it may also be removed from the reaction medium by distillation.

The product obtained from step (b) is then brought into contact with an excess of at least one transition metal halide at a low temperature, for example at about $-10°$ C. The reaction is continued by heating the reaction medium to a temperature between, for example, $70°$ and $150°$ C.

The transition metal halide excess is advantageously such that the atomic ratio M/Mg during the reaction is about twice the atomic ratio M/Mg desired for the catalyst obtained.

Finally, the product formed during this reaction is washed and dried.

The catalysts according to the invention are very useful for the polymerization of olefins, in particular ethylene, when they form part of catalytic systems also comprising at least one activator selected from among the hydrides and the organometallic compounds of the metals of groups I to III of the Periodic Table in an amount such that the atomic ratio of the metal of the activator to the transition metal of the catalyst is between 0.1 and 100. The activator may be selected from the group consisting of trialkylaluminiums, halogenodialkylaluminiums, alkylsiloxalanes (such as those described in French Pat. No. 2,241,569), and alkylaluminoxanes.

The catalysts may be activated in situ in the polymerization reactor. They may also be activated beforehand. In the latter case, it is preferred to carry out the activation in two steps. First, the catalyst and the activator are brought into contact with one another at a low temperature and generally in the presence of a solvent, such as a saturated aliphatic or cycloaliphatic hydrocarbon, in relative amounts such that the atomic ratio of the metal of the activator to the transition metal of the catalyst is between 0.1 and 10. The produce obtained is then preferably stabilized with the aid of an unsaturated hydrocarbon containing, for example, from 6 to 12 carbon atoms, in an amount such that the ratio of the number of moles of unsaturated hydrocarbon to the number of atom-grams of transition metal of the preactivated catalyst is between 1 and 10. In a second step, the remainder of the activator is added to the preactivated catalyst, either prior to the polymerization or in the polymerization reactor.

The present invention also applies to catalysts for the catalysts according to the invention to the polymerization of ethylene and the copolymerization of ethylene with α-olefins having from 3 to 8 carbon atoms, at a temperature between 20° and 350° C., and under a pressure between 1 and 2,500 bars, in the presence of a catalytic system such as described above.

Preferably, the homopolymerization or the copolymerization is carried out at a temperature between 20° and 200° C., under a pressure between 1 and 200 bars, and in solution or in suspension in an inert liquid hydrocarbon having at least 6 carbon atoms.

Alternatively, the polymerization or the copolymerization can also be carried out at a temperature between 180° and 350° C., under a pressure between 400 and 2,500 bars, the average residence time of the catalyst system in the polymerization reactor being between 2 and 100 seconds. The ethylene or the mixture of ethylene and α-olefins to be polymerized may be treated with a transfer agent, such as hydrogen, in a proportion ranging up to 2 mol%.

The purpose of the following examples is to illustrate several embodiments of the present invention without implying a limitation.

EXAMPLES 1 TO 6—PREPARATION OF THE CATALYSTS

In a reactor equipped with regulated heating and cooling means, 40 g of magnesium ethylate, $(C_2H_5O)_2Mg$, are suspended in 150 ml of methylcyclohexane (MCH). The reaction medium is cooled to $-15°$ C. and a solution of 17.5 g of acetyl chloride in methylcyclohexane is added dropwise, with vigorous stirring; the atomic ratio Cl/Mg during the halogenation reaction is 0.64. When the introduction of the solution of acetyl chloride has ended, the reaction medium is left to return to ambient temperature and a check is made to ensure that the liquid phase no longer contains chlorine. The suspension obtained is filtered and the precipitate is washed several times with methylcyclohexane and dried in a vacuum.

10 g of the dry product obtained are then brought into contact with 50 ml of a transition metal halide or mixture of transition metal halides specified in Table I, with stirring, and the mixture is cooled to $-10°$ C. The reaction medium is then heated gradually to the temperature T indicated in Table I, and that temperature is maintained for two hours. The reaction medium is then left to cool to ambient temperature. 100 ml of methylcyclohexane are added and the catalyst obtained is filtered off, rinsed with the same solvent and dried in vacuo. The catalyst has the formula $M_nMg(OC_2H_5)_{2-m}Cl_{m+4n}$, M denoting titanium or the mixture of titanium and vanadium, depending on the particular case. The values of n and m shown in Table I are calculated from the percentages by weight of Mg, M, and Cl, measured by elementary analysis.

TABLE I

| EXAMPLE | TRANSITION METAL HALIDE | T °C | n | m |
|---|---|---|---|---|
| 1 | TiCl$_4$ | 110 | 0.43 | 1.15 |
| 2 | TiCl$_4$ | 140 | 0.84 | 0.32 |
| 3 | TiCl$_4$ | 70 | 0.18 | 1.83 |
| 4 | (VCl$_4$)$_{0.86}$·TiCl$_4$ | 150 | 0.95 | 0.20 |
| 5 | (VCl$_4$)$_{1.16}$·TiCl$_4$ | 70 | 0.28 | 1.55 |
| 6 | (VCl$_4$)$_{0.04}$·TiCl$_4$ | 70 | 0.19 | 1.68 |

EXAMPLES 7 TO 14—POLYMERIZATION OF ETHYLENE UNDER LOW PRESSURE

The catalysts obtained in accordance with Examples 1 to 6 are preactivated, in suspension in a saturated $C_{11}$-$C_{12}$ hydrocarbon fraction by an organic aluminum derivative in an atomic ratio Al/M of 1, and then stabilized with hexene in a molar ratio $$\left(\frac{\text{hexene}}{M} = 5\right).$$

The preactivator used in Example 7 is dimethylethyldiethylsiloxalane (designated by A hereafter), and the one used in Examples 8 to 14 is Chlorodiethylaluminium (designated as B hereafter). Activator C is tetraisobutylaluminoxane, $(i\text{-}C_4H_9)_4Al_2O$.

The activator is added in an amount such that the atomic ratio Al/M is equal to 8 (except for Example 7, where this ratio is equal to 9).

600 ml of the above-mentioned $C_{11}$-$C_{12}$ hydrocarbon fraction are introduced into a steel autoclave reactor having a capacity of 1 liter, followed by ethylene up to saturation under a pressure of 6 bars, and then by the suspension of the catalystic system, prepared beforehand, in an amount containing 0.1 milliatomgram of transition metal. The ethylene is polymerized at a temperature of 200° C. for a period of 1 minute, under a constant pressure of 6 bars of ethylene. The solution is then recovered and the polymer is filtered off at ambient temperature. This gives the catalytic yield of polyethylene, $Y_c$, shown in Table II, expresed in g/minute/milliatomgram of transition metal/mole of ethylene/liter.

TABLE II

| EXAMPLE | EXAMPLE NO. | ACTIVATOR | $Y_c$ |
|---|---|---|---|
| 7 | 1 | A | 770 |
| 8 | 2 | C | 600 |
| 9 | 3 | A | 800 |
| 10 | 4 | B | 520 |
| 11 | 5 | B | 510 |
| 12 | 5 | C | 580 |
| 13 | 6 | B | 580 |
| 14 | 6 | C | 950 |

EXAMPLES 15 TO 19—POLYMERIZATION OF ETHYLENE UNDER HIGH PRESSURE

The catalysts obtained in accordance with Examples 1, 2, 3, and 5 are preactivated, in suspension in methylcyclohexane, with the aid of chlorodiethylaluminium (atomic ratio Al/M of 1), then stabilized with hexene $$\left( \text{molar ratio } \frac{\text{hexene}}{M} = 5 \right),$$

and finally activated with chlorodiethylaluminium in an amount such that the atomic ratio Al/M has the value shown in Table III.

In an autoclave reactor having a volume 0.6l, kept at a temperature of 230° C., ethylene is polymerized continuously under a pressure of 600 bars, the catalytic system being injected at a rate such that the average residence time of the catalyst in the reactor is about 30 seconds. The flow-rate of ethylene is 10 kg/hour. The concentration of the metal M, expressed in milliatomgram per liter, is shown in Table III. The polymerization is carried out in the presence of hydrogen at the molar concentration also shown in Table III.

The polyethylene is obtained with a catalytic yield $Y_c$ specified in Table III, expressed in kg/milliatomgram of transition metal. Its weight-average molecular weight, Mw, and its number-average molecular weight, Mn, are measured by gel permeation chromatography. Its melt index (MI), measured in accordance with ASTM Standard Specification D 1238-73, is expressed in dg/minute. The ratio Mw/Mn represents the polydispersity index.

TABLE III

| EXAMPLE | CATALYST INFORMATION EXAMPLE NO. | M | M milliatomgram/l | $H_2$, % | $Y_c$ | Mn | $\frac{Mw}{Mn}$ | MI |
|---|---|---|---|---|---|---|---|---|
| 15 | 1 | 12 | 0.125 | 0.5 | 7.4 | 11,500 | 8.3 | 3.6 |
| 16 | 1 | 8 | 0.062 | 0.2 | 6.2 | 17,500 | 5.4 | 1 |
| 17 | 2 | 6 | 0.19 | 1 | 4.5 | 14,000 | 5.5 | 11 |
| 18 | 3 | 6 | 0.062 | 1 | 5.6 | 16,500 | 4.8 | 13 |
| 19 | 5 | 6 | 0.125 | 1 | 9.1 | 16,000 | 4.4 | 17 |

EXAMPLE 20—COPOLYMERIZATION OF ETHYLENE AND PROPYLENE

Chlorodiethylaluminium is added to the catalyst of Example 4, in suspension in methylcyclohexane, so that the atomic ratio Al/M is equal to 6.

Under the same conditions as in Examples 15 to 19, a mixture of ethylene and propylene is polymerized continuously in the presence of 0.25 mol% of hydrogen, the flow feeding the reactor consisting of 7.3 kg/hour of ethylene and 2.7 kg/hour of propylene. The suspension of the catalytic system contains 0.25 milliatomgrams of metals, M, per liter.

A copolymer is obtained with a yield of 2.7 kg/milliatomgram. The copolymer has the following characteristics:

$$Mn = 26,000; \frac{Mw}{Mn} = 3.9; MI = 4; \text{density} = 0.933 \text{ g/cm}^3$$

The polymerization process according to the invention, illustrated especially by the above examples, makes it possible to obtain polymers having a density of between 0.91 and 0.97 g.cm$^3$ and a melt index of between 0.2 and 20 dg/minute.

It will be apparent to those skilled in the art that various modifications and variations could be made in the composition of the invention without departing from the scope or spirit of the invention.

What is claimed is:

1. A catalyst for the homopolymerization of ethylene and the copolymerization of ethylene with α-olefins, comprising at least one transition metal, M, selected from the group consisting of the metals of groups IVa to VIa of the Periodic Table; magnesium, Mg; and at least one halogen, X, wherein said catalyst has the general formula $M_nMg(OR)_{2-m}X_{m+4n}$, wherein R is an alkyl radical containing from 1 to 4 carbon atoms, $0 < m < 2$ and $0.05 < n < 1$ and the ratio m/n is within the range of 0.2 to 10.2.

2. The catalyst of claim 1, wherein the transition metal, M, is either titanium or vanadium or some combination thereof.

3. A process for the preparation of a catalyst according to claim 1, comprising:
   (a) reacting an organic acid halide, R'COX with a magnesium alcoholate, Mg(OR)$_2$, wherein R' is an alkyl group containing from 1 to 12 carbon atoms, R is an alkyl group containing from 1 to 4 carbon atoms, and the reactants have an atomic ratio such that X/Mg < 1;
   (b) washing the product obtained from step (a) with a solvent;
   (c) reacting the product obtained from step (b), at a temperature between −10° and +150° C., with an excess of a transition metal halide wherein the transition metal is selected from the metals of groups IVa to VIa of the Periodic Table and wherein said transition metal is at its maximum valency; and
   (d) washing and then drying the product obtained from step (c).

4. The process of claim 3, wherein said transition metal halide is titanium tetrachloride, vanadium tetrachloride, or some combination thereof.

5. A catalytic system for the homopolymerization of ethylene and the copolymerization of ethylene with α-olefins, which comprises the catalyst of claim 1 and at least one activator chosen from the hydrides and the organometallic compounds of the metals of groups I to III of the Periodic Table, wherein the atomic ratio of the metal of said activator to the transition metal of the catalyst is between 0.1 and 100.

6. The catalytic system of claim 5, wherein said activator consists of trialklaluminiums, halogenoalklaluminiums, alkylsiloxalanes, alkylaminoxanes, and a combination thereof.

7. A catalyst for the homopolymerization of ethylene and the copolymerization of ethylene with α-olefins, prepared by the process of:
(a) reacting an organic acid halide, R'COX with a magnesium alcoholate, Mg(OR)$_2$, wherein R' is an alkyl group containing from 1 to 12 carbon atoms, X is a halogen, R is an alkyl group containing from 1 to 4 carbon atoms, and the reactants have an atomic ratio such that X/Mg<1;

(b) removing from the product obtained from step (a) an ester formed by the reaction of the organic acid halide with the magnesium alcoholate:
(c) reacting the product obtained from step (b), at a temperature between $-10°$ and $+150°$ C., with an excess of a transition metal halide wherein the transition metal is selected from the metals of groups IVa to VIa of the Periodic Table and wherein said transition metal is at its maximum valency; and
(d) washing and then drying the product obtained from step (c).

* * * * *